United States Patent [19]
Will et al.

[11] 3,833,422

[45] Sept. 3, 1974

[54] REGENERATIVE METAL-WATER BATTERY

[75] Inventors: Fritz G. Will, Scotia; Stephan P. Mitoff, Elnora, both of N.Y.

[73] Assignee: General Electric Company, Schenectady, N.Y.

[22] Filed: Apr. 20, 1972

[21] Appl. No.: 245,841

[52] U.S. Cl.................................. 136/20, 136/6 F
[51] Int. Cl. ......................................... H01m 35/02
[58] Field of Search ...................... 136/6, 83, 20, 86

[56] References Cited
UNITED STATES PATENTS

| | | | |
|---|---|---|---|
| 2,102,701 | 12/1937 | Gyuris............................... | 136/83 R |
| 3,245,836 | 4/1966 | Agruss.............................. | 136/86 A |
| 3,404,035 | 10/1968 | Kummer et al.................... | 136/6 FS |
| 3,455,744 | 7/1969 | Werth et al....................... | 136/86 A |
| 3,533,848 | 10/1970 | Winn................................. | 136/6 F |
| 3,535,163 | 10/1970 | Dzieciuch et al................. | 136/6 FS |
| 3,554,806 | 1/1971 | Greenberg et al. ............... | 136/83 T |
| 3,607,405 | 9/1971 | Christopher....................... | 136/20 |
| 3,607,417 | 9/1971 | McRae et al. .................... | 136/86 |
| 3,679,480 | 7/1972 | Brown et al....................... | 136/6 FS |
| 3,703,415 | 11/1972 | Mitoff et al....................... | 136/83 R |

*Primary Examiner*—Winston A. Douglas
*Assistant Examiner*—C. F. Lefevour
*Attorney, Agent, or Firm*—Paul R. Webb II, Joseph T. Cohen, Merome C. Squillaro

[57] ABSTRACT

A regenerative metal-water battery is disclosed which includes a metallic sodium or potassium reservoir in sealed communication with an inner vessel of a solid metal ion-conductive material, the metallic sodium or potassium in the reservoir, means for heating the metal, the metal adapted to provide an anode in the inner vessel of the battery, and water as the oxidant in the outer vessel of the battery and in contact with the outer wall of the inner vessel.

10 Claims, 1 Drawing Figure

PATENTED SEP 3 1974　　　　　　　　　　　3,833,422
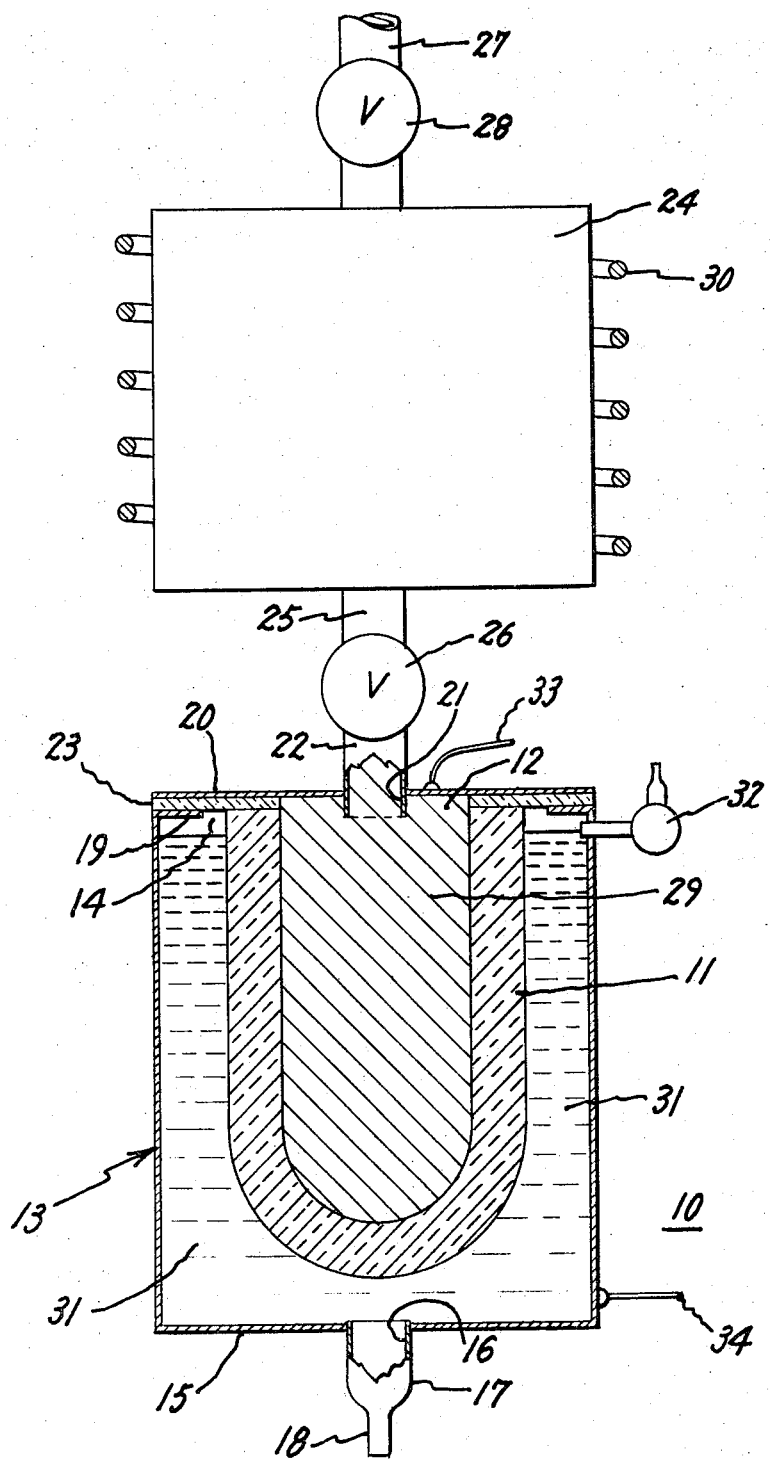

REGENERATIVE METAL-WATER BATTERY

This invention relates to regenerative batteries and, more particularly, to such batteries employing an anode of metallic sodium or potassium, a solid sodium or potassium ion-conductive electrolyte, and a water oxidant.

Sodium-sulfur cells, which operate at elevated temperatures, are known in the prior art as, for example, described in Kummer et al., Pat. No. 3,404,036 issued Oct. 1, 1968 under the title "Energy Conversion Device Comprising a Solid Crystalline Electrolyte and a Solid Reaction Zone Separator." The solid crystalline ion-conductive electrolyte in the above-mentioned sodium sulfur battery can be sodium beta-alumina.

Sodium amalgam-oxygen fuel cells are known in the prior art as, for example, described in Eidensohn Pat. No. 3,057,946 issued Oct. 9, 1962 under the title "Fuel Cell System." A sodium amalgam is flowed over the face of a metallic plate within an aqueous solution of sodium hydroxide to provide the anode. An oxygen diffusion electrode within the same electrolyte provides the cathode.

Sodium reservoirs for batteries employing sodium ion-conductive electrolyte vessels are known in the prior art as, for example, described in Kummer et al. Pat. No. 3,413,150 issued Nov. 26, 1968. In the upper portion of the battery there is a chamber wherein one or more reservoirs which contain molten sodium are connected to sodium ion-conductive vessels. On the opposite side of such vessels are conductive fiber sheets impregnated with cathodic reaction electrolyte.

In copending patent application Ser. No. 148,791, filed June 1, 1971, now U.S. Pat. No. 3,703,415, entitled "Primary Sodium-Water Battery" in the names of Stephan P. Mitoff and Fritz G. Will, there is described a battery employing sodium amalgam or sodium in an organic electrolyte as the anode and water as the cathode for operation at temperatures between 21.5° and 100°C.

In copending patent application Ser. No. 245,840 filed Apr. 20, 1972 filed concurrently herewith in the name of Fritz G. Will and entitled "Battery Casing and Regenerative Metal-Water Battery" there is described and claimed a battery employing a metallic sodium or potassium anode and a water oxidant. The battery has a sodium reservoir and a forced water circulation system. Both of the above copending patent applications are assigned to the same assignee as the present application.

Our present invention is directed to providing a regenerative metal-water battery, operable at a moderate temperature of at least the melting point of the metal which battery eliminates the need for electrical charging while employing low-cost reactants.

The primary objects of our invention are to provide a moderate temperature battery which has a zero self-discharge rate, high cell voltage and high energy density.

In accordance with one aspect of our invention a regenerative metal-water battery includes an inner vessel of a solid sodium or potassium ion-conductive material with one open end, a metal reservoir is in sealed communication with the open end of the inner vessel, metallic sodium or potassium in the reservoir, means for heating the metal, the metal adapted to provide an anode in the inner vessel, and a cathode of water as the sole oxidant in an outer metallic vessel surrounding the inner vessel.

These and various other objects, features and advantages of the invention will be better understood from the following description taken in connection with the accompanying drawing in which:

The single FIGURE of the drawing is a partial sectional view of a battery made in accordance with our invention.

In the single FIGURE of the drawing, there is shown generally at 10 a battery embodying our invention which has an inner vessel of a solid metal ion-conductive material wall 11 with one open end 12. The metal is selected from the class consisting of sodium and potassium. An outer metallic vessel 13 has an open end 14, a closed end 15 and an opening 16. While opening 16 is shown in opposite closed end 15, such opening can be located at other points in casing 13. A metallic fill tube 17 is affixed to closed end 15 and in communication with opening 16. Tube 17 is closed, for example, by welding at 18. A removable closure can also be employed. An inwardly extending flange 19 is affixed to metallic vessel 13 at its open end 14. Metallic vessel 13 surrounds inner vessel 11 with the exterior surface of flange 19 flush with the surface of the open end 12 of inner vessel 11. A metallic cover 20 has an opening 21 disposed therein. A metallic fill tube 22 is sealed to cover 20 and communicates with opening 21 therein. Cover 20 closes open end 14 of metallic vessel 13 and functions as a first electronic conductor adapted to contact the sodium anode. An alkalimetal and hydroxide resistant glass 23 seals cover 20 to the exterior surface of flange 19 and the upper surface of inner vessel 11. A reservoir 24 is in sealed communication with the open end of the inner vessel by being connected to fill tube 22 by means of an outlet tube 25 regulated a manual or automatic valve 26. An inlet tube 27 provided with a valve 28 is shown to fill reservoir 24 with a metal selected from the class consisting of sodium and potassium which is adapted to provide anode 29 in inner vessel 11. Means 30 for heating the metal in reservoir 24 are shown in the form of heating coils surrounding reservoir 24 to provide the metallic sodium or potassium in liquid or molten state during cell operation. Such heating means include also, for example, heating coils surrounding the remaining portion of the battery. Outer metallic vessel 13 is filled with a dilute aqueous solution 31 of alkali hydroxide, alkali chloride or other common salts, which functions as the oxidant. A preferred concentration range for the electrolyte is between 1 to 10 percent by weight of the aqueous solution. Vessel 13 functions as a second electronic conductor in contact with the water oxidant. During operation of the battery, water is consumed, alkali hydroxide is formed and hydrogen is evolved. A vent 32 is provided in vessel 13 to affect the release of hydrogen at a safe pressure. Electrical leads 33 and 34 are shown in electrical connection with each of the electronic conductors. The resulting structure is a regenerative sodium-water battery.

The above battery has an open circuit voltage of 1.9 volts and a theoretical energy density of 450 watt hours per pound (wh/lb).

We found that we could form a battery by positioning an inner vessel of an ionic conducting material of sodium or potassium beta-alumina having an open end within an outer vessel of a suitable, chemically stable material such as nickel, Kovar alloy, iron or steel with a fill closure which is preferably in the opposite closed end. The outer metallic vessel has an inwardly extending flange affixed to its open end. The inner and outer casings are aligned so that the exterior surface of the flange is flush with the surface of the open end of the other casing. At the opposite closed end of the outer vessel a metallic fill tube of the same material as the outer vessel is affixed and in communication with the opening in the closed end. A washer of a suitable sodium resistant glass, such as Corning Glass No. 7056, General Electric Company Glass No. 1013, Sovirel Glass No. 747, or Kimble Glass No. N-51A is positioned on the upper surfaces of the open end of the inner vessel and the exterior flange of the outer vessel. A metallic cover of a suitable, chemically stable metal made of nickel, Kovar alloy, iron or steel with a centrally disposed opening therein has extended therefrom a metallic fill tube of the same metal. The cover and fill tube can be a unitary structure or separate parts which are sealed together, for example, by welding. The cover is positioned on the opposite surface of the glass washer. The glass washer is then heated to a temperature of 1000°C in a furnace whereby the cover is sealed by the glass to the upper ends of the inner casing and the exterior surface of the flange. The metallic cover functions as a first electronic conductor adapted to contact the sodium. If a non-metallic cover or no cover is employed an electronic conductor is provided within the inner vessel in the form of a metal wire of nickel or Kovar alloy affixed to a metallic portion in the cover or fill tube, or extended outside the battery.

A reservoir or container of a suitable chemically stable metal made of niobium, Kovar alloy or tantalum is in sealed communication with the open end of the inner vessel by being connected by an outlet tube to the cover fill tube. A flow valve, which can be operated manually or automatically is interposed preferably between the outlet tube and the fill tube. An inlet tube with a valve is provided also for the reservoir. Means are provided for heating the sodium or potassium metal. For example, a heating coil surrounds the reservoir or the entire battery.

The battery is provided with a metallic sodium or potassium anode and a water oxidant. The metal is transferred preferably in liquid state through the inlet tube into the reservoir, the inner vessel and connecting tubes. Water is transferred through the fill tube in the outer vessel to fill the space between the exterior surface of the inner vessel and the interior surface of the outer vessel. The fill tube is then sealed, for example, by welding or by a cap closure. As it will be appreciated, the anode and cathode electrodes can be positioned in the opposite vessels with the reservoir connected to the outer vessel. The electrical leads are attached to exterior portions of the battery so that each lead is connected electrically to its respective electronic conductor. The discharge can be carried out at least until the alkali hydroxide concentration reaches the solubility limit, i.e., approximately 77 percent by weight for NaOH at 100°C. At this point in operation, the concentrated alkali hydroxide is replaced with a fresh aqueous supply and the alkali container is refilled. Since hydrogen gas is also a reaction product, a needle valve 32 is provided in the upper portion of the outer vessel. Any excess heat during operation can be removed in any suitable manner. The above structure results in a regenerative metal-water battery.

Examples of regenerative metal-water batteries made in accordance with our invention are set forth below:

EXAMPLE I

A regenerative metal-water battery was assembled. A sodium beta-alumina disk which was 1 centimeter in diameter and 1 millimeter thick was sealed to one open end of a glass tube having a length of 10 centimeters to provide an inner vessel. Metallic sodium was added to the tube from a syringe thereby filling a portion of the tube adjacent the interior surface of the beta-alumina disk. A Kovar alloy wire was positioned within the tube adjacent the interior surface of the disk and extended out through the opposite end of the tube which was sealed against the wire. This wire provided an electronic conductor within the tube and its associated lead outside of the tube for the battery.

A Pyrex glass container was filled substantially with 25 percent by weight sodium hydroxide solution which container formed an outer vessel which surrounded the beta-alumina disk and the portion of the inner glass tube. A second electronic conductor in the form of nickel foam was positioned in the sodium-hydroxide solution adjacent to but spaced from the beta-alumina disk. A nickel wire, which was connected to the nickel foam, extended outwardly from the sodium hydroxide solution to provide the second electrical lead. The outer vessel was not provided with a cover closing its upper open end. The resulting structure was a regenerative metal-water battery.

EXAMPLE II

The battery of Example I was raised to a temperature of 115°C by heating the structure in a furnace. At a temperature of 115°C, the open circuit voltage of the battery was 1.68 volts and the following polarization behavior was exhibited as shown below in Table I:

TABLE I

| Current — Milliamperes | Potential — Volts |
|---|---|
| 0 | 1.68 |
| 0.16 | 1.55 |
| 0.28 | 1.44 |
| 0.36 | 1.36 |
| 0.52 | 1.24 |
| 0.82 | 0.96 |
| 2.08 | 0.44 |

EXAMPLE III

A regenerative metal-water battery was assembled similar to the battery described above in Example I. However, the beta-alumina disk was held adjacent the inner open end of the glass tube by providing an epoxy layer around the perimeter of the disk and glass tube. Platinum foil which had been platinized was used rather than the nickel foam in Example I. The sodium was introduced into the inner vessel by vacuum distillation. The resulting structure was a regenerative metal-water battery.

EXAMPLE IV

The battery of Example III was raised to a temperature of 123°C. The open circuit voltage of this battery was 1.85 volts and the following polarization behavior was exhibited as shown below in Table II.

TABLE II

| Current — Milliamperes | Potential — Volts |
|---|---|
| 0 | 1.85 |
| 1.0 | 1.45 |
| 2.0 | 1.28 |
| 3.0 | 1.13 |
| 4.0 | 0.99 |
| 5.0 | 0.87 |
| 6.0 | 0.75 |
| 7.0 | 0.64 |
| 8.0 | 0.52 |
| 9.0 | 0.45 |
| 10.0 | 0.35 |
| 14.0 | 0.05 |

While other modifications of the invention and variations thereof which may be employed within the scope of the invention have not been described, the invention is intended to include such as may be embraced within the following claims.

What we claim as new and desire to secure by Letters Patent of the United States is:

1. A regenerative metal-water battery comprising an inner vessel with a solid metal ion-conductive material wall portion, the metal selected from the class consisting of sodium and potassium, an outer vessel with a fill closure surrounding the solid metal ion-conductive material wall portion of the inner vessel, a reservoir in sealed communication with the metal ion-conductive material wall portion, a metal selected from the class consisting of sodium and potassium in the reservoir, means for heating the metal, the metal adapted to provide the anode adjacent the solid ion-conductive material wall portion, a first electronic conductor for contacting the metal, a cathode comprising water as sole oxidant in contact with the outer surface of the solid metal ion-conductive material wall portion of the inner vessel, and a second electronic conductor for contacting the water oxidant.

2. A regenerative metal-water battery as in claim 1, in which a cover closes the open end of the outer vessel.

3. A regenerative metal-water battery as in claim 1, in which the first electronic conductor is a metallic cover closing the open end of the outer vessel and insulated electrically therefrom.

4. A regenerative metal-water battery as in claim 1, in which the first electronic conductor is a metallic wire adjacent the inner wall of the solid metal ion-conductive material portion.

5. A regenerative metal-water battery as in claim 1, in which the second electronic conductor is a metallic outer vessel.

6. A regenerative metal-water battery comprising an inner vessel of a solid metal ion-conductive material wall with one open end, the metal selected from the class consisting of sodium and potassium, an outer vessel with a fill closure surrounding the inner vessel, a reservoir in sealed communication with the open end of the inner vessel, a metal selected from the class consisting of sodium and potassium in the reservoir, means for heating the metal, the metal adapted to provide the anode in the inner vessel, a first electronic conductor for contacting the metal, a cathode comprising water as sole oxidant in contact with the outer surface of the inner vessel, and a second electronic conductor for contacting the water oxidant.

7. A regenerative metal-water battery as in claim 6, in which a cover closes the open end of the outer vessel.

8. A regenerative metal-water battery as in claim 6, in which the first electronic conductor is a metallic cover closing the open end of the outer vessel and insulated electrically therefrom.

9. A regenerative metal-water battery as in claim 6, in which the first electronic conductor is a metallic wire within the inner vessel.

10. A regenerative metal-water battery as in claim 6, in which the second electronic conductor is a metallic outer vessel.

* * * * *